June 12, 1923. Re. 15,627
G. CLEMENTS
VACUUM CLEANER
Original Filed June 14, 1911
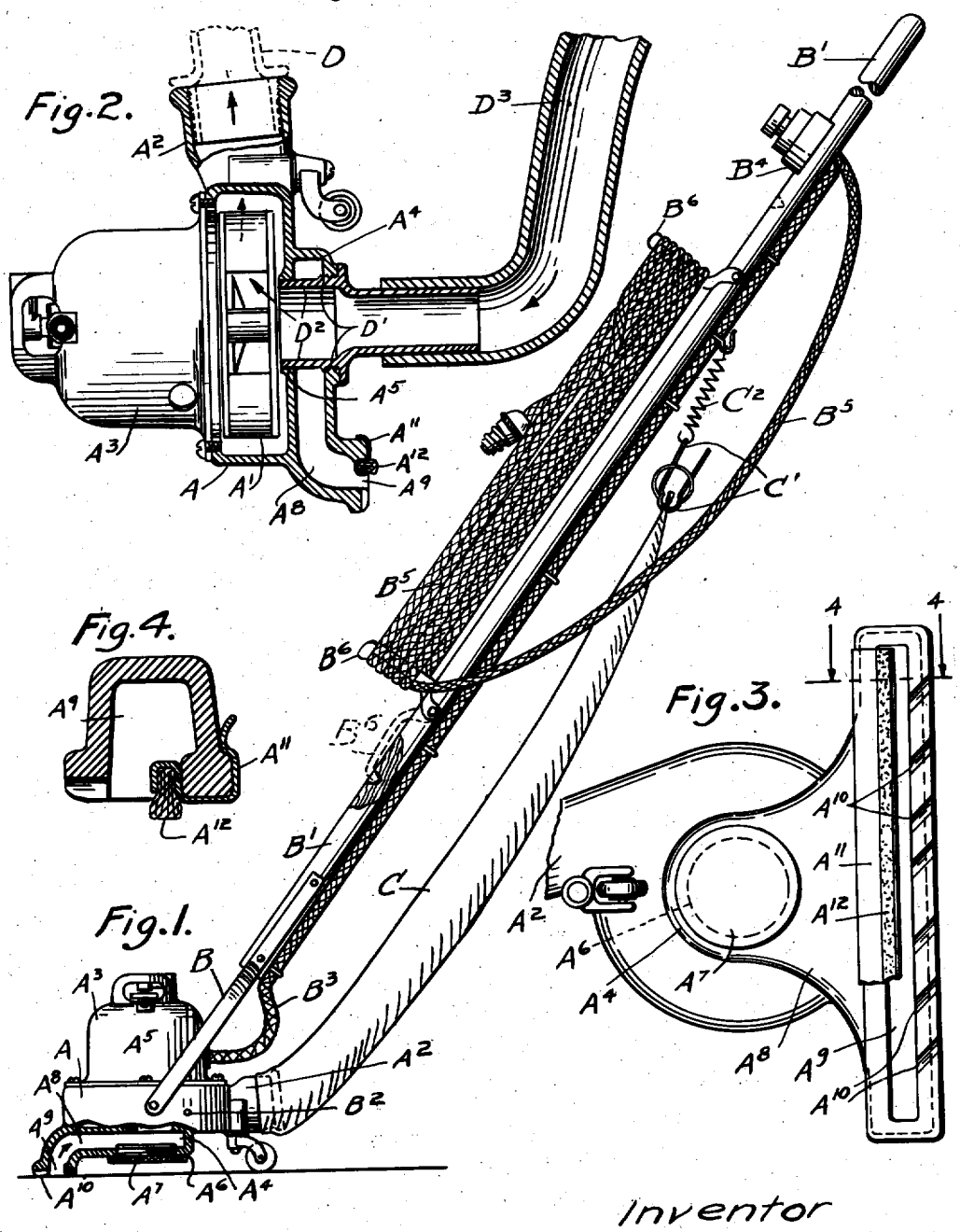
Inventor
George Clements
By Parker & Carter
Attorney Reissued June 12, 1923.

Re. 15,627

UNITED STATES PATENT OFFICE.

GEORGE CLEMENTS, OF CHICAGO, ILLINOIS, ASSIGNOR, BY DIRECT AND MESNE ASSIGNMENTS, OF ONE-HALF TO CLEMENTS MFG. CO., OF CHICAGO, ILLINOIS, A CORPORATION OF ILLINOIS, AND ONE-HALF TO THE HOOVER COMPANY, OF NORTH CANTON, OHIO, A CORPORATION OF OHIO.

VACUUM CLEANER.

Original No. 1,392,624, dated October 4, 1921, Serial No. 633,011, filed June 14, 1911. Application for reissue filed April 30, 1923. Serial No. 635,712.

*To all whom it may concern:*

Be it known that I, GEORGE CLEMENTS, a citizen of the United States, and a resident of Chicago, in the county of Cook and State of Illinois, have invented a new and useful Improvement in Vacuum Cleaners, of which the following is a full, clear, and exact description.

My invention relates to improvements in vacuum cleaners, and has for one of its principal objects to provide means for connecting a suction hose directly with the inlet of the pumping chamber such connection causing the nozzle connection between the normal floor nozzle and the inlet to the pump chamber to be disconnected.

It is illustrated in the accompanying drawings wherein—

Figure 1 is a side elevation with parts shown in section,

Figure 2 is a side elevation with the suction hose connected,

Figure 3 is a bottom plan view of a portion of the structure illustrated in Fig. 1, Figure 4 is a cross section along the line 4—4 of Fig. 3.

Like parts are indicated by the same letter in all the figures.

A is a flat cylindrical casing, the interior of which I call the pumping chamber and in it rotates the fan and pumping device $A^1$. $A^2$ is the discharge outlet therefrom tangentially arranged. The motor casing $A^3$ is attached to one side of the fan casing, and preferably integral with the latter is the suction chamber $A^4$ communicating therewith through the port $A^5$ and provided with the screw-threaded passageway $A^6$ closed by the cap $A^7$. The suction passage $A^8$ connects with the suction chamber $A^4$ at one end and at the other extends into an elongated narrow suction nozzle $A^9$, the outer lip of which is preferably provided with the inclined grooves or corrugations $A^{10}$. $A^{11}$ is a spring clip which removably engages the inner lip of the suction nozzle and carries the soft squeegee $A^{12}$ projecting outwardly from the nozzle. The pump casing A is pivotally mounted on an eccentric axis between the forks B on the handle $B^1$ and is limited in its rotation movement by the lugs $B^2$ placed on the same side of the center of gravity as the axis of rotation so that the pump casing and its associated parts may be tilted forwardly and downwardly but not be permitted to proceed too far in that direction. The conductors $B^3$ lead from the motor to the controlling switch $B^4$ on the handle, from which switch leads the flexible conducting wire $B^5$, which is shown in Fig. 1 as wound about the hooks $B^6$ on the handle $B^1$.

The dust receiving bag C is removably attached to one end of the tangential discharge way $A^2$ and at the other end is closed by the spring clip $C^1$ which is supported by means of the spring $C^2$ from the handle B.

D is a replaceable or removable hose tube provided with a screw-threaded portion $D^1$ to engage the screw-threaded port $A^6$ in the wall of the suction chamber, an extension $D^2$ of which passes through the suction chamber and is received into the port $A^5$, the screw-threaded portions $D^1$ and $A^6$ cooperating to retain the extension $D^2$ in seated relation with port $A^5$, and a projecting end on which the hose $D^3$ is adapted to be attached. When the hose tube is removed, the cap $A^7$ is substituted therefor and the hose tube may be screw-threaded into the outlet so as to deliver air under pressure if desirable.

It will be evident that while I have shown in my drawing an operative device, many changes might be made in size, shape and arrangement of the several parts without departing materially from the spirit of my invention.

The use and operation of the invention are quite obvious.

When it is to be used for cleaning floors in the usual manner, the hose tube is removed and the cap $A^7$ applied to close the port $A^6$. The wire cable is removed from the hooks and the proper connection made, whereupon the motor is set in operation to drive the fan or pump and suck the dust up through the suction nozzle discharging into the bag C, whence the air escapes, leaving the material to be collected behind.

When the device is to be used for wood or other smooth or hard floors, the removable squeegee is attached.

When the hose is to be used, the cap $A^7$ is removed and the hose tube secured in seated relation in the inlet of the pump chamber as indicated in Fig. 2. Any kind of a suction device may be attached to one end of the hose, the other end being slipped over the projecting portion of the hose tube.

If the device is to be used for delivering air under pressure, the hose tube is screw-threaded into position in the discharge way as indicated in dotted lines in Fig. 2.

The two arms which project from the handle are adapted to be thrown up in position when desired as shown in Fig. 1 to form a reel on which the cable can be wound.

The handle is connected a little back of the center of gravity of the device so that the latter tends to tilt downwardly and forwardly, but the engagement of the handle by the stop prevents the device tilting too far forwardly.

Certain features shown and described but not claimed herein were made the subject matter of divisional applications Nos. 705,398; 705,399 and 705,400.

I claim:—

1. A vacuum cleaner consisting of a casing provided with a pump chamber and a suction chamber and separated therefrom by a dividing wall provided with an opening, the walls of the suction chamber terminating in a suction nozzle and the suction chamber provided with an opening registering with the opening in the dividing wall and adapted to receive a cap for closing it or a hose tube extending into the inner opening.

2. A vacuum cleaner comprising a pump chamber, a suction chamber, having an outlet opening to the pump chamber, a suction nozzle and an inlet opening, and a removable closure therefor, said openings adapted to receive a connecting inlet tube.

3. In a pneumatic cleaner, a casing having a fan chamber, a suction chamber arranged directly below said fan chamber and separated therefrom by a dividing wall provided with an opening, said suction chamber being provided with an opening in the bottom thereof in line with the opening in the dividing wall, and a coupling member adapted to be secured in the opening in the bottom of the suction chamber and having a tubular extension which extends across said suction chamber and into the opening in the dividing wall between said suction chamber and the fan chamber.

4. A suction chamber having a fan chamber and a second chamber adjacent to said fan chamber and separated therefrom by a dividing wall provided with an opening, said second chamber being provided with an opening in the wall thereof opposite the opening in the dividing wall, a coupling member adapted to be secured in the opening in the second chamber and having a tubular extension adapted to extend across said second chamber in operative relation to the opening in said dividing wall, and a cover adapted to close the opening in said second chamber when said coupling member is removed.

5. In a pneumatic cleaner, a casing having a pump chamber and a second chamber adjacent thereto and terminating in a cleaning device, there being an apertured dividing wall between said chambers, the outer wall of said second chamber having a supplemental opening adapted to receive either a cap for closing it or a coupling communicating immediately with the aperture in the dividing wall.

6. A suction cleaner having a pump chamber and a second chamber separated therefrom by a dividing wall provided with an opening whereby the second chamber may communicate with the first mentioned chamber, the second chamber having an inlet mouth and an opening in operative relation to the opening in the dividing wall, and a coupling member adapted to be applied to the last mentioned opening and having an extension adapted to cut off communication between said first mentioned opening and said inlet mouth.

7. In a cleaner, a casing having a fan chamber, and a suction chamber adjacent thereto and separated therefrom by a dividing wall provided with an opening, said suction chamber communicating with a suction mouth, the wall of said suction chamber having a removable portion, and a hose connection adapted to be secured in direct communicating relation to said opening when said removable portion is displaced.

8. In a vacuum cleaner, the combination of a casing with a nozzle attached thereto, a suction pipe leading therefrom and a suction hose attachment adapted to be inserted through the suction pipe and to simultaneously cut off the nozzle connection and connect the hose with the suction.

9. A vacuum cleaner comprising a suction chamber having an oblong primary suction inlet and a secondary circular suction inlet, a pump chamber having a circular inlet from the suction chamber the two circular inlets in substantial alinement, a removable cap for the secondary inlet, and a removable inleading tube for the pump chamber adapted to connect the two circular inlets.

10. A vacuum cleaner comprising a suction chamber having a primary suction inlet and a secondary suction inlet, means for closing the secondary inlet, a pump having an inlet from the suction chamber, and means adapted to connect the pump inlet with the secondary inlet when the closing means is removed and thus disconnect the suction chamber from the pump chamber.

11. In a suction cleaner, a suction fan casing having end walls and a peripheral wall, the fan casing provided with an inlet in one end wall and with a substantially peripheral discharge, a collecting nozzle having a downwardly facing laterally elongated open inlet mouth and a connection between the nozzle and the fan inlet, an operating handle having at its forward end means for attachment to the suction cleaner, a fan in said casing, mechanism for rotating said fan and mobile supports for said suction cleaner, in combination with means for connection with a secondary collecting nozzle, a converter member adapted to be inserted through the connection and to seat in said fan inlet, means for securing the converter member in closing relation to said fan inlet.

12. In a suction cleaner, a fan casing comprising end walls and having a peripheral wall, a fan in said casing, means for driving said fan, one of said end walls being provided with an approximately centrally located intake, an approximately peripheral fan discharge, a collecting nozzle secured to one of said end walls about said intake and adapted to discharge into said intake, the end wall provided with the fan intake being adapted to receive and seat therein in closing relation with the fan intake, a replaceable converter member for attachment of a secondary nozzle to the fan intake.

13. The combination with a vacuum cleaner having a suction fan casing provided with an inlet, a fan in said casing, means for rotating the fan, a forwardly extending nozzle, mobile supports for the cleaner, of replaceable tubular means maintained in normal fixed closing relation to said fan casing inlet for connecting a cleaning tool to the fan inlet.

14. A vacuum cleaner comprising a motor, a fan driven thereby, a fan casing therefor provided with an air inlet opening, a suction nozzle in operative connection with said opening, a replaceable suction hose attachment member, and means for securing it to the wall of said pump chamber in connecting relation with said air inlet opening.

15. A vacuum cleaner comprising a motor, a fan driven thereby, a fan casing therefor, provided with an air inlet opening aligned with the axis of rotation of the fan, a suction nozzle normally in operative connection with said opening, a replaceable suction hose attachment, and means for connecting it directly to said opening.

16. A vacuum cleaner comprising a motor, a suction fan driven thereby, a fan casing provided with an air inlet opening, a suction nozzle and a connection between said nozzle and said opening, a replaceable hose connection, and means for securing one end of said hose connection in position to communicate with said inlet opening.

17. The combination with a vacuum cleaner provided with a pump chamber, and a suction nozzle directly connected with said pump chamber, of a converter member having means for direct engagement with said pump chamber through a wall thereof, and constructed when so engaged to shut off communication between said pump chamber and said nozzle.

18. The combination with a vacuum cleaner provided with a pump chamber, a suction nozzle, and a suction chamber interposed between the nozzle and the pump chamber and having direct communication with both, of a converter member having means for direct engagement with said pump chamber at the point of communication between the latter and the suction chamber, whereby when the converter member is in position communication between the pump casing and the suction chamber is prevented.

Signed at Chicago, in the county of Cook and State of Illinois, this 13th day of March, A. D. 1923.

GEORGE CLEMENTS.